(12) United States Patent
Adachi et al.

(10) Patent No.: US 6,685,770 B2
(45) Date of Patent: Feb. 3, 2004

(54) INK FOR INK-JET RECORDING

(75) Inventors: Keiichi Adachi, Kanagawa (JP); Junichi Yamanouchi, Kanagawa (JP)

(73) Assignee: Fuji Photo Film Co., Ltd., Ashigara (JP)

( * ) Notice: Subject to any disclaimer, the term of this patent is extended or adjusted under 35 U.S.C. 154(b) by 15 days.

(21) Appl. No.: 10/046,763

(22) Filed: Jan. 17, 2002

(65) Prior Publication Data

US 2002/0157568 A1 Oct. 31, 2002

(30) Foreign Application Priority Data

Jan. 19, 2001 (JP) ........................................ 2001-011821

(51) Int. Cl.$^7$ ............................................... C09D 11/02
(52) U.S. Cl. ................................. 106/31.58; 106/31.43; 106/31.49
(58) Field of Search ........................... 106/31.58, 31.43, 106/31.49

(56) References Cited

U.S. PATENT DOCUMENTS

| 4,508,570 A | 4/1985 | Fujii et al. |
| 5,626,655 A | 5/1997 | Pawlowski et al. |
| 5,658,376 A | * 8/1997 | Noguchi et al. .......... 106/31.43 |
| 5,837,043 A | 11/1998 | Wong et al. |
| 6,447,592 B1 | * 9/2002 | Taniguchi ................ 106/31.58 |
| 6,508,870 B1 | * 1/2003 | Komatsuzawa et al. .. 106/31.27 |
| 2002/0107301 A1 | * 8/2002 | Yamanouchi et al. ....... 523/160 |

FOREIGN PATENT DOCUMENTS

EP        0 583 096 A1    2/1994

* cited by examiner

*Primary Examiner*—C. Melissa Koslow
*Assistant Examiner*—Veronica F. Faison
(74) *Attorney, Agent, or Firm*—Burns, Doane, Swecker & Mathis, LLP

(57) ABSTRACT

An ink for ink-jet comprising: a water-soluble dye; a compound represented by the following formula (1):

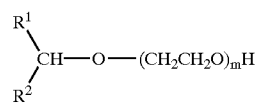

(1)

wherein, $R^1$ and $R^2$ each independently represents a saturated hydrocarbon having from 4 to 10 carbon atoms with the proviso that the total number of carbon atoms contained in the saturated hydrocarbons represented by $R^1$ and $R^2$ is from 8 to 18, and m represents an integer of from 3 to 20; and triethylene glycol monobutyl ether.

19 Claims, No Drawings

INK FOR INK-JET RECORDING

FIELD OF THE INVENTION

The present invention relates to ink for ink-jet printers and ink-jet recording methods using the ink.

BACKGROUND OF THE INVENTION

The ink-jet recording method has become popular rapidly and its growth has not yet ceased, because its material cost is low, it permits high-speed recording, it generates less noise upon recording and it facilitates color recording.

Ink-jet recording methods include a method of applying pressure by a piezo-element, thereby ejecting ink droplets, a method of generating air bubbles in ink by heat, thereby ejecting ink droplets and a method of sucking and ejecting ink droplets by making use of electrostatic force. As ink for ink-jet, an aqueous ink, an oily ink and a solid (fusible type) ink are available.

A colorant incorporated in ink for ink-jet is required to have high solubility in a solvent, permit high-density recording, have a good color hue, have excellent fastness to light, heat, air, water or chemicals, be free from toxicity, have a high purity and be available at a low cost. The ink itself is required to be fixed well to an image-receiving material without causing smudges, have excellent storage stability and be free from clogging at an ejecting opening.

Although various dyes or pigments have been proposed and practically used for ink for ink-jet, a colorant capable of completely satisfying the above-described requests has not yet been found. As means for solving this problem, ink comprising a dye, glycerin, diethylene glycol and an ethylene-oxide adduct of alcohol is disclosed in JP-A-58-74761 (the term "JP-A" as used herein means an "unexamined published Japanese patent application") and JP-A-60-92369, while use of an ethylene-oxide adduct of a long-chain linear alcohol is disclosed in JP-A-2000-265098. These proposals are however accompanied with the drawbacks that clogging of a nozzle is diminished but not prevented completely and the quality of an image formed using the above-described ink deteriorates during storage.

In JP-A-6-88048, JP-A-8-333532 and JP-A-8-333533, and U.S. Pat. Nos. 5,837,043 and 5,626,655, proposed are inks comprising an ethylene-oxide adduct of a higher alcohol and capable of lessening smudge of a recorded image, but these inks also involve problems such as tendency to cause clogging and a change in color tone due to poor storage stability of an image after printing.

SUMMARY OF THE INVENTION

An object of the present invention is therefore to provide an ink for ink-jet which does not clog a nozzle, has a sufficient image density and is excellent in storage stability of the image formed using the ink; and an ink-jet recording method using the same.

The inventors have carried out an extensive investigation with a view to attaining the above-described object. As a result, they completed the below-described invention.

(1) An ink for ink-jet comprising: a water-soluble dye; a compound represented by the following formula (1):

(1)

wherein, $R^1$ and $R^2$ each independently represents a saturated hydrocarbon having from 4 to 10 carbon atoms with the proviso that the total number of carbon atoms contained in the saturated hydrocarbons represented by $R^1$ and $R^2$ is from 8 to 18, and m represents an integer of from 3 to 20; and triethylene glycol monobutyl ether.

(2) The ink for ink-jet as described in (1) above, wherein the total number of carbon atoms contained in the saturated hydrocarbons represented by $R^1$ and $R^2$ is from 8 to 16.

(3) The ink for ink-jet as described in (1) or (2) above, wherein m in formula (1) represents an integer of from 5 to 20.

(4) The ink for ink-jet as described in (1) or (2) above, wherein m in formula (1) represents an integer of from 6 to 18.

(5) The ink for ink-jet as described in any one of (1) to (4) above, which further comprises a water-soluble organic solvent.

(6) The ink for ink-jet as described in any one of (1) to (5) above, which further comprises one of an antiseptic agent and an antifungal agent.

(7) The ink for ink-jet as described in any one of (1) to (6) above, wherein an amount of the compound represented by the formula (1) is from 0.001 wt % to 15 wt % based on 100 wt % of a total amount of the ink.

(8) The ink for ink-jet as described in any one of (1) to (7) above, wherein an amount of the water-soluble dye is from 0.1 wt % to 20 wt % based on 100 wt % of a total amount of the ink.

(9) The ink for ink-jet as described in any one of (1) to (8) above, wherein an amount of the triethylene glycol monobutyl ether is from 0.1 wt % to 20 wt % based on 100 wt % of a total amount of the ink.

(10) The ink for ink-jet as described in any one of (5) to (9) above, wherein an amount of the water-soluble organic solvent is from 0.1 wt % to 20 wt % based on 100 wt % of a total amount of the ink.

(11) The ink for ink-jet as described in any one of (6) to (10) above, wherein an amount of the one of an antiseptic agent and an antifungal agent is from 0.001 wt % to 3 wt % based on 100 wt % of a total amount of the ink.

(12) The ink for ink-jet as described in any one of (5) to (11) above, wherein the water-soluble organic solvent has a lower vapor pressure than that of water.

(13) The ink for ink-jet as described in any one of (5) to (12) above, wherein the water-soluble organic solvent is one of ethylene glycol, diethylene glycol, triethylene glycol, propylene glycol, glycerin, 2-pyrrolidone and triethanolamine.

(14) The ink for ink-jet as described in any one of (1) to (13) above, wherein a surface tension of the ink is from 28 mN/m to 34 mN/m.

(15) The ink for ink-jet as described in any one of (1) to (14) above, wherein pH of the ink is from 6 to 10.

(16) The ink for ink-jet as described in any one of (1) to (15) above, wherein a viscosity of the ink is 30 mPa·S or less.

(17) An ink-jet recording method comprising ejecting an ink for ink-jet comprising: a water-soluble dye; a compound represented by the following formula (1):

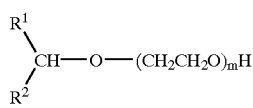

$$\begin{array}{c} R^1 \\ \diagdown \\ CH-O-(CH_2CH_2O)_mH \\ \diagup \\ R^2 \end{array} \quad (1)$$

wherein, $R^1$ and $R^2$ each independently represents a saturated hydrocarbon having from 4 to 10 carbon atoms with the proviso that the total number of carbon atoms contained in the saturated hydrocarbons represented by $R^1$ and $R^2$ is from 8 to 18, and m represents an integer of from 3 to 20; and triethylene glycol monobutyl ether.

DETAILED DESCRIPTION OF THE INVENTION

The present invention will hereinafter be described specifically.

First, a compound represented by formula (1) is described. $R^1$ and $R^2$ each independently represents a saturated hydrocarbon having 4 to 10 carbon atoms (ex. n-butyl, i-butyl, n-pentyl, n-hexyl, n-heptyl, n-octyl, 2-ethylhexyl, n-nonyl and n-decyl). $R^1$ and $R^2$ have 8 to 18 carbon atoms in total, with 8 to 16 being preferred. m stands for 3 to 30, preferably 5 to 20, more preferably 6 to 18.

The compound of the invention represented by the formula (1) is available by a method as described in Takehiko Fujimoto: "New Guide for Surfactants (wholly revised edition), page 94(1992)". When the raw material employed is a mixture, the numbers of carbons atoms of $R^1$ and $R^2$ are not indicated respectively but by the total number. It is needless to say that m represents a mean value. Accordingly, two or more compounds different in $R^1$, $R^2$ or m, or a mixture of them may be employed.

Specified examples of the compound represented by the formula (1) will be mentioned below, but the present invention is not limited thereto.

TABLE 1

Specific compounds of (1)

| Exemplified compounds | $R^1$ | $R^2$ | m |
|---|---|---|---|
| 1 | n-$C_4H_9$ | n-$C_4H_9$ | 3 |
| 2 | i-$C_4H_9$ | i-$C_4H_9$ | 5 |
| 3 | i-$C_4H_9$ | i-$C_4H_9$ | 9.5 |
| 4 | i-$C_4H_9$ | i-$C_4H_9$ | 11.4 |
| 5 | n-$C_5H_{11}$ | n-$C_5H_{11}$ | 8 |
| 6 | n-$C_5H_{11}$ | n-$C_5H_{11}$ | 10 |
| 7 | n-$C_5H_{11}$ | n-$C_5H_{11}$ | 11.4 |
| 8 | n-$C_5H_{11}$ | n-$C_5H_{11}$ | 13.5 |
| 9 | n-$C_5H_{11}$ | n-$C_6H_{13}$ | 15 |
| 10 | n-$C_6H_{13}$ | n-$C_6H_{13}$ | 10 |
| 11 | n-$C_6H_{13}$ | n-$C_6H_{13}$ | 13.6 |
| 12 | n-$C_6H_{13}$ | n-$C_6H_{13}$ | 15.8 |
| 13 | n-$C_6H_{13}$ | n-$C_7H_{15}$ | 16 |
| 14 | n-$C_7H_{15}$ | n-$C_7H_{15}$ | 15 |
| 15 | n-$C_7H_{15}$ | n-$C_7H_{15}$ | 16.5 |
| 16 | n-$C_8H_{17}$ | n-$C_8H_{17}$ | 14 |
| 17 | n-$C_8H_{17}$ | n-$C_8H_{17}$ | 17.6 |
| 18 | n-$C_8H_{17}$ | n-$C_{10}H_{21}$ | 20 |
| 20 | $C_{12}H_{25}$ | —$C_{14}H_{29}$ | 9 |
| 21 | $C_{12}H_{25}$ | —$C_{14}H_{29}$ | 12 |

The compound represented by the formula (1) is added in an amount of 0.001 to 15 wt. %, preferably 0.005 to 10 wt. %, more preferably 0.01 to 5 wt. %, based on the total amount of the ink.

Water-soluble dyes to be used in the invention include acid dyes, direct dyes, basic dyes, reactive dyes and food dyes of Color Index. Dyes are however not limited thereto and those having, in the molecule thereof, a carboxyl group or sulfo group and being substantially soluble in ink can be employed.

The followings are specific examples of the dyes. Acidic dyes include C.I. Acid Yellow 17, 23, 42, 44, 79 and 142, C.I. Acid Red 1, 8, 13, 14, 18, 26, 27, 35, 37, 42, 52, 82, 87, 89, 92, 97, 106, 111, 114, 115, 134, 186, 249, 254 and 289, C.I. Acid Blue 9, 29, 45, 92 and 249, and C.I. Acid Black 1, 2, 7, 24, 26 and 94.

Food dyes include C.I. Food Yellow 3 and 4, C.I. Food Red 7, 9 and 14, and C.I. Food Black 1 and 2.

Direct dyes include C.I. Direct Yellow 1, 12, 24, 26, 33, 44, 50, 86, 120, 132, 142 and 144, C.I. Direct Red 1, 4, 9, 13, 17, 20, 28, 31, 39, 80, 81, 83, 89, 225 and 227, C.I. Direct Blue 1, 2, 6, 15, 22, 25, 71, 76, 79, 86, 87, 90, 98, 163, 165, 199 and 202, C.I. Direct Black 19, 22, 32, 38, 51, 56, 71, 74, 75, 77, 154, 168 and 171.

Basic dyes include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91, C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155, and C.I. Basic Black 2 and 8.

Reactive dyes include C.I. Reactive Yellow 1, 5, 11, 13, 14, 20, 21, 22, 25, 40, 47, 51, 55, 65 and 67, C.I. Reactive Red 1, 14, 17, 25, 26, 32, 37, 44, 46, 55, 60, 66, 74, 79, 96 and 97, C.I. Reactive Blue 1, 2, 7, 14, 15, 23, 32, 35, 38, 41, 63, 80 and 95, C.I. Reactive Black 3, 4, 7, 11, 12 and 17.

The water-soluble dyes are not limited to the above-exemplified ones, but aryl or hetero-aryl azo dyes and azomethine dyes, each having a phenol, naphthol, aniline, pyrazolone, pyridone, thiazole, open-chain methylene compound, pyrazolotriazole or pyrrolotriazole; containing, in their molecule, a water-soluble group typified by carboxyl or sulfo group; and being substantially soluble in ink may be employed.

A detailed description will next be made of a penetrant.

In the invention, triethylene glycol monobutyl ether is used as a penetrant.

As well as it, surfactants imparting penetrability can also be employed as a penetrant. Examples of such a surfactant include anionic surfactants such as fatty acid salts, ester salts of a higher alcohol, alkylbenzene sulfonate salts, sulfosuccinate ester salts and phosphate ester salts of a higher alcohol; and nonionic surfactants such as ethylene oxide adducts of a higher alcohol, ethylene oxide adducts of an alkylphenol, ethylene oxide adducts of a polyhydric alcohol fatty acid ester, and acetylene glycol and ethylene oxide adducts thereof.

A water-soluble organic solvent will next be described specifically. As the water-soluble organic solvent to be used in the invention, that having a lower vapor pressure than water is preferred. Specific examples include polyhydric alcohols typified by ethylene glycol, propylene glycol, diethylene glycol, triethylene glycol, polyethylene glycol, thiodiglycol, dithiodiglycol, 2-methyl-1,3-propanediol, 1,2, 6-hexanetriol, acetylene glycol derivatives, glycerin and trimethylolpropane; lower alkyl ethers of a polyhydric alcohol such as ethylene glycol monomethyl (or ethyl) ether, diethylene glycol monomethyl (or ethyl) ether and triethylene glycol monoethyl (or butyl) ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolane; and polyfunctional compounds such as diacetone alcohol, diethanolamine and triethanolamine.

Examples of the antiseptic or antifungal agent include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred embodiments of the invention will hereinafter be described in detail.

At least one of the water-soluble dyes to be used in the ink for ink-jet of the invention is preferably added in an amount of 0.1 to 20 wt. %, more preferably 0.5 to 10 wt. %, based on the ink. When plural water-soluble dyes are used as a mixture, they can be mixed at any ratio.

Basically, the water-soluble dye of the invention becomes an ink when dissolved in an aqueous medium. The term "aqueous medium" as used herein means that obtained by adding, to water or a mixture of water and a small amount of a water miscible organic solvent, an additive such as surfactant, humectant, stabilizer and antiseptic as needed.

The compound represented by the formula (1) will next be described specifically. $R^1$ and $R^2$ each independently a saturated hydrocarbon having 4 to 10 carbon atoms (ex. n-butyl, i-butyl, n-pentyl, n-hexyl, n-heptyl, n-octyl, 2-ethylhexyl, n-nonyl and n-decyl). $R^1$ and $R^2$ have 8 to 18 carbon atoms in total, with 8 to 16 being preferred. m stands for 3 to 30, preferably 5 to 20, more preferably 6 to 18.

The compound of the formula (1) is added in an amount of 0.001 to 5 wt. %, preferably 0.005 to 3 wt. %, more preferably 0.01 to 3 wt. %, based on the ink.

As the penetrability-imparting solvent, triethylene glycol monobutyl ether is used in the invention. It is added in ink preferably in an amount of 0.1 to 20 wt. % based on the ink. Addition of it in an amount ranging from 0.5 to 15 wt. % is more preferred, because it causes neither smudge of a recorded image nor print-through.

As well as the above-described penetrant, surfactants capable of imparting penetrability can be used in the invention. Examples of such a surfactant include fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and "Surfynol 104, 440, 465 and TG", each product of Air Products and Chemicals Inc.)

The above-exemplified penetrability-imparting surfactants may be used either singly or in combination. Addition of them in an amount range of from 0.01 to 10 wt. % based on the ink is preferred, with a range of from 0.1 to 5 wt. % being more preferred because it causes neither smudge of a printed image nor print-through.

As the water-soluble organic solvent to be added to the ink of the invention mainly for preventing drying, water-soluble organic solvents having a lower vapor pressure than water are preferred. Specific examples include polyhydric alcohols typified by ethylene glycol, propylene glycol, diethylene glycol, triethylene glycol, polyethylene glycol, thiodiglycol, dithiodiglycol, 2-methyl-1,3-propanediol, 1,2, 6-hexanetriol, acetylene glycol derivatives, glycerin and trimethylolpropane; lower alkyl ethers of a polyhydric alcohol such as ethylene glycol monomethyl (or ethyl) ether, diethylene glycol monomethyl (or ethyl) ether and triethylene glycol monoethyl (or butyl) ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; and polyfunctional compounds such as diacetone alcohol, diethanolamine and triethanolamine. Of these, ethylene glycol, diethylene glycol, triethylene glycol, propylene glycol, glycerin, 2-pyrrolidone and triethanolamine are more preferred.

The above-exemplified water-soluble organic solvents may be used either singly or in combination. It is preferably added in an amount of 0.1 to 20 wt. %, preferably 0.5 to 15 wt. %, each based on the ink.

Examples of the antiseptic or antifungal agent usable in the invention include sodium dehydroacetate, 2-phenoxyethanol, sodium benzoate, sodium pyridinethion-1-oxide, ethyl p-hydroxybenzoate and 1,2-benzisothiazolin-3-one and salts thereof. Of these, 1,2-benzisothiazolin-3-one is preferred. Details of them are described in "Dictionary of Antibacterial and Antifungal Agents" (ed. by The Society for Antibacterial and Antifungal Agents, Japan).

The above-exemplified antiseptics or antifungal agents may be used either singly or in combination. Each of them is preferably added in an amount of 0.001 to 3 wt. %, more preferably 0.01 to 1.00 wt. %, each based on the ink.

For an aqueous ink for ink-jet recording available by the invention, deionized water is preferably used. To prevent clogging of an orifice with an ink due to drying and to improve various properties such as discharge stability, adaptability to a print head and ink cartridge, storage stability, drying speed after printing, image quality and image storage stability, additives selected from drying preventive, penetration accelerator, ultraviolet absorber, antioxidant, viscosity regulator, surface tension regulator, dispersant, dispersion stabilizer, antifungal agent, rust inhibitor, pH regulator, antifoaming agent and chelating agent can be added as needed.

A description will next be made of a surfactant to be used for regulation of surface tension or used as a dispersant, dispersion stabilizer or antifoaming agent. Surfactants usable in the invention include anionic surfactants such as fatty acid salts, ester salts of a higher alcohol, alkylbenzene sulfonate salts, sulfosuccinate ester salts and phosphate ester salts of a higher alcohol; cationic surfactants such as aliphatic amine salts and quaternary ammonium salts; nonionic surfactants such as ethylene oxide adducts of a higher alcohol, ethylene oxide adducts of an alkylphenol, ethylene oxide adducts of a polyhydric alcohol fatty acid ester, and acetylene glycol and ethylene oxide adducts thereof; amphoteric surfactants such as amino acid type and betaine type ones; and fluorine compounds and silicone compounds. They may be used either singly or in combination. Of these, preferred are sodium dodecylbenzene sulfonate, lauryl sulfonate and sodium dioctylsulfosuccinate and ethylene oxide adducts having 4 to 20 moles of ethylene oxides added thereto, e.g., "Surfynol 440", "Surfynol 465" and "Surfynol 485" (each, trade name; product of Air Products and Chemicals, Inc.). No limitation is imposed on the amount of the surfactant, but 0.01 to 15 wt. %, more preferably 0.1 to 10 wt. % based on the ink is preferred.

As the surface tension regulator, the above-exemplified nonionic, cationic and anionic surfactants can be used in the invention. When it is added or even not added, the ink of the invention preferably has a surface tension of 28 to 34 mN/m.

As the ultraviolet absorber to be added to improve storage stability of an image, usable are benzotriazole compounds as described in JP-A-58-185677, JP-A-61-190537, JP-A-2-782, JP-A-5-197075 and JP-A-9-34057, benzophenone compounds as described in JP-A-46-2784, JP-A-5-194483 and U.S. Pat. No. 3,214,463, cinnamic acid compounds as described in JP-B-48-30492 (the term "JP-B" as used herein means an "examined Japanese patent publication"), JP-B-56-21141 and JP-A-10-88106, triazine compounds as described in JP-A-4-298503, JP-A-8-53427, JP-A-8-239368, JP-A-10-182621 and JP-W-8-501291 (the term "JP-W" as used herein means an "a published Japanese national stage of international application"), compounds as described in Research Disclosure No. 24239, and so-called fluorescent brighteners which emit fluorescence, absorbing ultraviolet rays and are, for example, stilbene and benzoxazole compounds.

The ultraviolet absorber is preferably added in an amount of 0.1 to 30 wt. %, more preferably 1 to 10 wt. % based on the ink.

As the antioxidant for improving storage stability of an image, various organic and metal complex type fading preventives can be used in the invention. Organic fading preventives include hydroquinones, alkoxyphenols, dialkoxyphenols, phenols, anilines, amines, indanes, coumarones, alkoxyanilines and heterocycles, while metal complexes include nickel complexes and zinc complexes. More specifically, compounds as described in "Research Disclosure, No. 17643, VII, Section I or J, No. 15162, No. 18716, left column on page 650, No. 36544, page 527, No. 307105, page 872, and the patent cited in No. 15162, and compounds embraced in the formula of the typical compounds and compound examples described on pages 127 to 137 of JP-A-62-215272.

The antioxidant is preferably added in an amount of 0.1 to 30 wt. %, preferably 1 to 10 wt. % based on the ink.

For storage stability, the ink of the invention has preferably a pH of 6 to 10, more preferably 7 to 10. Examples of a pH regulator to be used for this purpose include hydroxides of an alkali metal such as lithium hydroxide and potassium hydroxide, carbonates such as sodium carbonate and sodium bicarbonate, inorganic bases such as potassium acetate, sodium silicate and disodium phosphate and organic bases such as N-methyldiethanolamine and triethanolamine.

For viscosity regulation, isopropanol, butanol, 1,5-pentanediol, polyvinyl alcohol, urea or urea derivative can be used. It is added preferably in an amount of 0.01 to 20 wt. %, more preferably 0.1 to 10 wt. % based on the ink. By adding or not adding it, the viscosity of the ink of the invention is preferably adjusted to 30 mPa·S or less, more preferably 20 mPa·S or less.

Examples of the rust inhibitor include acidic lead sulfite, sodium thiosulfate, ammonium thioglycolate, diisopropylammonium nitrite, pentaerythritol tetranitrate, dicyclohexylammonium nitrite and benzotriazole, dicyclohexylammonium nitrite and benzotriazole. It is preferably added in an amount of 0.02 to 5.00 wt. %, based on the ink.

As another additive, chelating agents typified by EDTA can be used in order to trap metal ions which are presumed to elute from impurities of a color material or cartridge, benzotriazole and derivatives thereof may be used as needed.

The ink of the invention can be used for formation of an image on known recording materials, more specifically, ordinary paper, resin-coated paper such as paper exclusively used for ink-jet recording as described in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic paper, cloth, glass, metal and ceramic.

As a support for these recording materials, any one of pulp, synthetic paper and plastic film sheet may be used. Paper or a plastic film having both sides thereof laminated with polyolefin (ex. polyethylene, polystyrene, polyethylene terephthalate or polybutene, or copolymer thereof) is preferably employed as the support. Addition of a white pigment (ex. titanium oxide or zinc oxide) or a tinting dye (ex. cobalt blue, ultramarine or neodymium oxide) to polyolefin is preferred.

In an ink receptive layer disposed on the support, a pigment or aqueous binder is incorporated. White pigments are preferred as the pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate and organic pigments such as styrene pigments, acrylic pigments, urea resins and melamine resins. As the white pigment contained in the ink receptive layer, porous inorganic pigments, particularly, synthetic amorphous to silica having a large pore area is preferred.

Examples of the aqueous binder contained in the ink receptive layer include water-soluble polymers such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxide and polyalkylene oxide derivatives and water dispersible polymers such as styrene butadiene latex and acrylic emulsion. These aqueous binders may be used either singly or in combination. Of them, polyvinyl alcohol and silanol-modified polyvinyl alcohol are particularly preferred for adhesion to the pigment and peel resistance of the ink receptive layer.

The ink receptive layer may contain, in addition to, the pigment and aqueous binder, a mordant, a water resistance improver, light resistance improver, surfactant, and the like additives.

The mordant to be added to the ink receptive layer is preferably immobilized. A polymeric mordant is preferably employed for this purpose.

Polymeric mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134 and JP-A-1-161236, and U.S. Pat. Nos. 2,484,430, 2,548,564, 3,148,061, 3,309,690, 4,115,124, 4,124,386, 4,193,800, 4,273,853, 4,282,305 and 4,450,224. Receiving materials containing the polymer mordant as described on pages 212 to 215 of JP-A-1-161236 are particularly preferred.

A water resistance improver is effective for improving water resistance of an image and as this agent, cationic resins are particularly desired. These cationic resins include polyamide polyamine epichlorohydrin, polyethyleneimine, polyaminesulfone, poly(dimethyl diallyl ammonium chloride), cation polyacrylamide and colloidal silica. Of these cationic resins, polyamide polyamine epichlorohydrin is particularly preferred.

Examples of the light resistance improver include zinc sulfate, zinc oxide, hindered amine antioxidants and benzophenone or benzotriazole ultraviolet absorbers.

As the other additives to the ink receptive layer, pigment dispersants, thickeners, antifoaming agents, dyes, fluorescent brighteners, antiseptics, pH regulators, matting agents and film hardeners can be used. The ink receptive layer may be a single layer or a double layer.

The recording material may have a back coat layer disposed thereon. To layers (including back coat layer) constituting the recording material, a polymer latex (polymer fine-particle dispersion) may be added. The polymer latex is used in order to improve the physical properties of a film, for example, stabilizing size and preventing curling, adhesion and cracks. A description on the polymer latex can be found in JP-A-62-245258, JP-A-62-1316648 and JP-A-62-110066. Addition of a polymer latex having a low glass transition point (40° C. or lower) to a mordant-containing layer enables to prevent occurrence of cracks or curing of the layer. Addition of a polymer latex having a high glass transition point also prevents occurrence of curling.

The ink of the invention can be used freely for any ink-jet recording method. It is used in a known recording method, for example, a charge control method of discharging ink by making use of electrostatic induction power, drop-on-demand method (pressure pulse method) making use of oscillation pressure of a piezoelectric element, acoustic ink-jet method of exposing ink to acoustic beams converted from electric signals and utilizing a radiation pressure for discharging ink, and thermal ink-jet (bubble jet) method of heating ink to form bubbles and making use of the pressure thus generated.

Full color printing using yellow, magenta and cyan inks can be conducted using the ink of the invention. Ink-jet recording methods include a method of jetting of a plurality of droplets of a low-density ink called "photo ink", each droplet having a small volume; a method of improving image quality by using a plurality of inks having substantially the same hue but different concentrations and a method of using a colorless transparent ink.

EXAMPLES

The present invention will hereinafter be described in detail by Examples. It should however be borne in mind that the embodiments of the invention are not limited thereto. In the below-described designations of "part" or "parts" mean part or parts by weight, respectively. In Table 1, exemplified compounds are shown.

Examples 1 to 8

In each example, after the below-described components were mixed and dissolved, the resulting solution was filtered through a membrane filter ("AstroPore CASL 20 2.5CMD", trade name; product of Fuji Photo Film) having a pore size of 0.2 μm, whereby the ink of the invention was prepared.

Ink of Example 1

| C.I. Direct Yellow 86 | 5.0 parts |
| Exemplified Compound 1 | 3.0 parts |
| Glycerin | 14.0 parts |
| Diethylene glycol | 15.0 parts |

-continued

| TEGmBE | 12.0 parts |
| 1,2-Benzisothiazolin-3-one | 0.1 part |
| Deionized water | 50.9 parts |

Ink of Example 2

| C.I. Acid Red 52 | 4.5 parts |
| Exemplified Compound 3 | 3.0 parts |
| Glycerin | 15.0 parts |
| Diethylene glycol | 11.0 parts |
| TEGmBE | 12.0 parts |
| Surfynol 465 | 0.5 part |
| 1,2-Benzisothiazolin-3-one | 0.2 part |
| Deionized water | 53.8 parts |

Ink of Example 3

| C.I. Direct Blue 87 | 3.5 parts |
| Exemplified Compound 6 | 2.0 parts |
| Glycerin | 14.0 parts |
| Diethylene glycol | 13.0 parts |
| TEGmBE | 12.0 parts |
| Triethanolamine | 6.5 parts |
| 1,2-Benzisothiazolin-3-one | 0.1 part |
| Deionized water | 48.9 parts |

Ink of Example 4

| C.I. Food Black 2 | 1.5 parts |
| C.I. Direct Black 19 | 2.5 parts |
| Exemplified Compound 7 | 2.0 parts |
| Glycerin | 12.0 parts |
| TEGmBE | 13.0 parts |
| 2-Pyrrolidone | 10.0 parts |
| Triethanolamine | 11.0 parts |
| 1,2-Benzisothiazolin-3-one | 0.1 part |
| Deionized water | 47.9 parts |

Ink of Example 5

| C.I. Direct Blue 87 | 2.5 parts |
| C.I. Acid Blue 9 | 1.0 part |
| Exemplified Compound 11 | 2.5 parts |
| Glycerin | 17.0 parts |
| Diethylene glycol | 12.0 parts |
| TEGmBE | 10.0 parts |
| Triethanolamine | 5.5 parts |
| 1,2-Benzisothiazolin-3-one | 0.1 part |
| Benzotriazole | 0.1 part |
| Deionized water | 49.3 parts |

Ink of Example 6

| C.I. Acid Red 52 | 1.2 parts |
| Exemplified Compound 7 | 1.5 parts |

-continued

| | | |
|---|---|---|
| Glycerin | 12.0 | parts |
| Diethylene glycol | 14.0 | parts |
| TEGmBE | 13.0 | parts |
| Triethanolamine | 6.0 | parts |
| Sodium dehydroacetate | 0.1 | part |
| Deionized water | 52.2 | parts |

Ink of Example 7

| | | |
|---|---|---|
| C.I. Acid Blue 87 | 4.0 | parts |
| Exemplified Compound 14 | 1.0 | part |
| Glycerin | 6.0 | parts |
| Diethylene glycol | 3.0 | parts |
| Ethylene glycol | 5.0 | parts |
| TEGmBE | 7.0 | parts |
| 1,2-Benzisothiazolin-3-one | 0.1 | part |
| Benzotriazole | 0.1 | part |
| Deionized water | 73.8 | parts |

Ink of Example 8

| | | |
|---|---|---|
| C.I. Acid Blue 9 | 3.0 | parts |
| Exemplified Compound 21 | 0.4 | part |
| Glycerin | 8.0 | parts |
| Triethylene glycol | 15.0 | parts |
| TEGmBE | 10.0 | parts |
| 1,2-Benzisothiazolin-3-one | 0.2 | part |
| Deionized water | 63.4 | parts |

Ink of Comparative Example 1

| | | |
|---|---|---|
| C.I. Acid Blue 9 | 3.0 | parts |
| Sec-$C_{15}H_{31}O$—$(CH_2CH_2O)_{12}$—H | 0.2 | part |
| Glycerin | 30.0 | parts |
| Deionized water | 66.8 | parts |

Ink of Comparative Example 2

| | | |
|---|---|---|
| C.I. Acid Red 52 | 4.0 | parts |
| Tergitol 15-S-15 | 6.0 | parts |
| Sulfolane | 3.9 | parts |
| Deionized water | 86.1 | parts |

Ink of Comparative Example 3

| | | |
|---|---|---|
| C.I. Direct Blue 87 | 3.0 | parts |
| Glycerin | 18.0 | parts |
| Diethylene glycol | 13.0 | parts |
| Triethanolamine | 6.5 | parts |
| 1,2-Benzisothiazolin-3-one | 0.1 | part |
| Deionized water | 59.4 | parts |

Ink of Comparative Example 4

Ink of Comparative Example 4 was prepared in a similar manner to Example 1 except for the use of triethylene glycol monoethyl ether instead of TEGmBE.

In the above-described Examples, TEGmBE means triethylene glycol monobutyl ether, while "Tergitol 15-S-15" means a surfactant of Union Carbide.

Evaluation Tests

With inks obtained in Examples 1 to 8 and Comparative Examples 1 to 4, printing was conducted using "Ink-jet Printer PM-770C" (product of Seiko Epson Corp.) and 1) clogging tendency, (2) image storage stability and (3) smudge of a printed image were evaluated in accordance with the following standards. The results are shown in Table 2. Following four papers were used for evaluation.

(A) Xerox Paper P (Fuji Xerox)
(B) High-grade paper for ink-jet printers (Fuji Photo Film)
(C) Photo Glossy Paper EX (Fuji Photo Film)
(D) PM photographic paper (Seiko Epson)

Evaluation Methods and Standards
(1) Clogging Tendency

Each of the inks was filled in the printer. After printing alphanumeric characters continuously for 10 minutes, printing was terminated. After the printer was allowed to stand for 2 weeks, a recovering operation from clogging was conducted. The clogging tendency was ranked by the number of operations conducted until the printer became free from blurring or blanks of characters.

A: normal printing after recovering operations within five times

B: normal printing after recovering operations within 6 to 10 times

C: normal printing after recovering operations of 11 times or greater.

(2) Image Storage Stability

A sample was prepared by solid printing by "Ink-jet Printer PM-770C (Seiko Epson Corp.) with each of the inks of Examples 1 to 8 and Comparative Examples 1 to 4. After measuring the density (Ci) rightly after printing, the density (Cf) was measured after exposure to xenon light (85000 lux) for 3 days by using a weatherometer (product of Atlas). The percent residue of dye was calculated using the equation: (Cf/Ci)×100. Image storage stability was ranked as A when the percent residue of dye was 70% or greater, as B when it was less than 70% but 40% or greater, and as C when it was less than 40%.

(3) Bleeding of Image

After the solid-printed sample was allowed to stand at room temperature for 1 week, the boundary between the printed portion and not printed portion was visually observed. The boundary free of change was ranked as A, the boundary with a slight smudge was ranked as B and that with a large smudge was ranked as C.

The evaluation results of clogging tendency, storage stability of image and smudge resistance are collectively shown in Table 2.

TABLE 2

| | What is evaluated | | | | | | | |
|---|---|---|---|---|---|---|---|---|
| | Clogging tendency | Storage stability of image | | | | Smudge resistance | | |
| | | (A) | (B) | (C) | (D) | (A) | (B) | (C) | (D) |
| Example 1 | A | B | B | A | A | B | A | A | A |
| Example 2 | A | A | A | A | A | A | A | A | A |
| Example 3 | A | A | A | A | A | A | A | A | A |

TABLE 2-continued

| | Clogging tendency | Storage stability of image | | | | Smudge resistance | | | |
|---|---|---|---|---|---|---|---|---|---|
| | | (A) | (B) | (C) | (D) | (A) | (B) | (C) | (D) |
| Example 4 | A | A | A | A | A | A | A | A | A |
| Example 5 | A | A | A | A | A | A | A | A | A |
| Example 6 | A | A | A | A | A | A | A | A | A |
| Example 7 | A | A | A | A | A | A | A | A | A |
| Example 8 | A | B | B | A | A | B | A | A | A |
| Comp. Ex. 1 | C | C | C | B | B | C | C | B | B |
| Comp. Ex. 2 | C | C | C | C | B | C | C | B | B |
| Comp. Ex. 3 | A | C | C | B | B | B | B | A | A |
| Comp. Ex. 4 | A | C | C | B | B | C | C | B | B |

The inks of the invention do not cause clogging at the tip of a nozzle, exhibit stable printing performance and are therefore of high reliability. Images printed on normal paper or ink-jet paper with the inks of the invention are superior in storage stability and smudge resistance to those printed with the inks of comparative examples. An image recorded with each of the inks of the invention on photo-quality paper, which has a silica porous layer disposed thereon as an image receptive layer, shows a further improvement in storage stability compared with the inks of Comparative Examples. Even in the case of so-called photo ink having a low dye density, the image quality is excellent without a deterioration in storage stability compared with the inks of Comparative Examples.

The entire disclosure of each and every foreign patent application from which the benefit of foreign priority has been claimed in the present application is incorporated herein by reference, as if fully set forth herein.

What is claimed is:

1. An ink for ink-jet comprising: a water-soluble dye; a compound represented by the following formula (1):

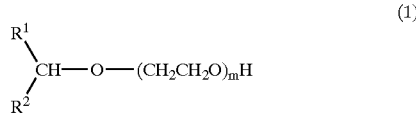

wherein, $R^1$ and $R^2$ each independently represents a saturated hydrocarbon having from 4 to 10 carbon atoms with the proviso that the total number of carbon atoms contained in the saturated hydrocarbons represented by $R^1$ and $R^2$ is from 8 to 18, and m represents an integer of from 3 to 20; and triethylene glycol monobutyl ether.

2. The ink for ink-jet of claim 1, wherein the total number of carbon atoms contained in the saturated hydrocarbons represented by $R^1$ and $R^2$ is from 8 to 16.

3. The ink for ink-jet of claim 1, wherein m in formula (1) represents an integer of from 5 to 20.

4. The ink for ink-jet of claim 1, wherein m in formula (1) represents an integer of from 6 to 18.

5. The ink for ink-jet of claim 1, which further comprises a water-soluble organic solvent.

6. The ink for ink-jet of claim 1, which further comprises one of an antiseptic agent and an antifungal agent.

7. The ink for ink-jet of claim 5, which further comprises one of an antiseptic agent and an antifungal agent.

8. The ink for ink-jet of claim 1, wherein an amount of the compound represented by the formula (1) is from 0.001 wt % to 15 wt % based on 100 wt % of a total amount of the ink.

9. The ink for ink-jet of claim 1, wherein an amount of the water-soluble dye is from 0.1 wt % to 20 wt % based on 100 wt % of a total amount of the ink.

10. The ink for ink-jet of claim 1, wherein an amount of the triethylene glycol monobutyl ether is from 0.1 wt % to 20 wt % based on 100 wt % of a total amount of the ink.

11. The ink for ink-jet of claim 5, wherein an amount of the water-soluble organic solvent is from 0.1 wt % to 20 wt % based on 100 wt % of a total amount of the ink.

12. The ink for ink-jet of claim 6, wherein an amount of the one of an antiseptic agent and an antifungal agent is from 0.001 wt % to 3 wt % based on 100 wt % of a total amount of the ink.

13. The ink for ink-jet of claim 5, wherein the water-soluble organic solvent has a lower vapor pressure than that of water.

14. The ink for ink-jet of claim 5, wherein the water-soluble organic solvent is one of ethylene glycol, diethylene glycol, triethylene glycol, propylene glycol, glycerin, 2-pyrrolidone and triethanolamine.

15. The ink for ink-jet of claim 1, wherein a surface tension of the ink is from 28 mN/m to 34 mN/m.

16. The ink for ink-jet of claim 1, wherein pH of the ink is from 6 to 10.

17. The ink for ink-jet of claim 1, wherein a viscosity of the ink is 30 mPa·S or less.

18. An ink-jet recording method comprising ejecting an ink for ink-jet comprising: a water-soluble dye; a compound represented by the following formula (1):

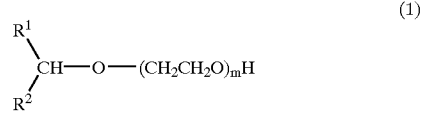

wherein, $R^1$ and $R^2$ each independently represents a saturated hydrocarbon having from 4 to 10 carbon atoms with the proviso that the total number of carbon atoms contained in the saturated hydrocarbons represented by $R^1$ and $R^2$ is from 8 to 18, and m represents an integer of from 3 to 20; and triethylene glycol monobutyl ether.

19. An ink for ink-jet comprising: a water-soluble dye; a compound represented by the following formula (1):

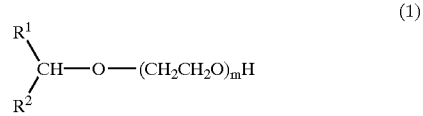

wherein, $R^1$ and $R^2$ each independently represents a saturated hydrocarbon having from 4 to 10 carbon atoms with the proviso that the total number of carbon atoms contained in the saturated hydrocarbons represented by $R^1$ and $R^2$ is from 8 to 18, and m represents an integer of from 3 to 20; and triethylene glycol monobutyl ether, wherein an amount of the compound represented by the formula (1) is from 0.001 wt % to 15 wt % based on 100 wt % of a total amount of the ink, an amount of the water-soluble dye is from 0.1 wt % to 20 wt % based on 100 wt % of a total amount of the ink, and an amount of the triethylene glycol monobutyl ether is from 0.1 wt % to 20 wt % based on 100 wt % of a total amount of the ink.

* * * * *